United States Patent [19]

Bratt

[11] 3,792,737
[45] Feb. 19, 1974

[54] POWER WRENCH WITH A TORQUE LIMITING COUPLING
[75] Inventor: Sven Åke Bratt, Tyreso, Sweden
[73] Assignee: Atlas Copco Aktiebolag, Nacka, Sweden
[22] Filed: May 17, 1972
[21] Appl. No.: 254,107

[30] Foreign Application Priority Data
May 19, 1971 Sweden.................... 6507/71

[52] U.S. Cl.................... 173/12, 192/56 F
[51] Int. Cl............................. B25b 23/14
[58] Field of Search. 173/12; 91/59; 192/.034, 56 F, 192/150

[56] References Cited
UNITED STATES PATENTS
2,683,512 7/1954 Boice.................. 192/56 F
3,442,362 5/1969 Bangerter.............. 192/.034 X
3,520,392 7/1970 Deremo et al........... 192/.034 X Primary Examiner—Ernest R. Purser
Attorney, Agent, or Firm—Flynn & Frishauf, P.C.

[57] ABSTRACT

A power wrench has a torque responsive clutch with a clutch member which starts a disengaging axial movement at a pre-determined torque load. In its axial movement, the clutch member causes a piston to move a short distance so as to open a pressure passage to a cylinder chamber bounded by a face of the piston. When the cylinder chamber is suddenly pressurized, the piston is forced to disengage the clutch member quickly and completely.

15 Claims, 8 Drawing Figures

PATENTED FEB 19 1974                3,792,737

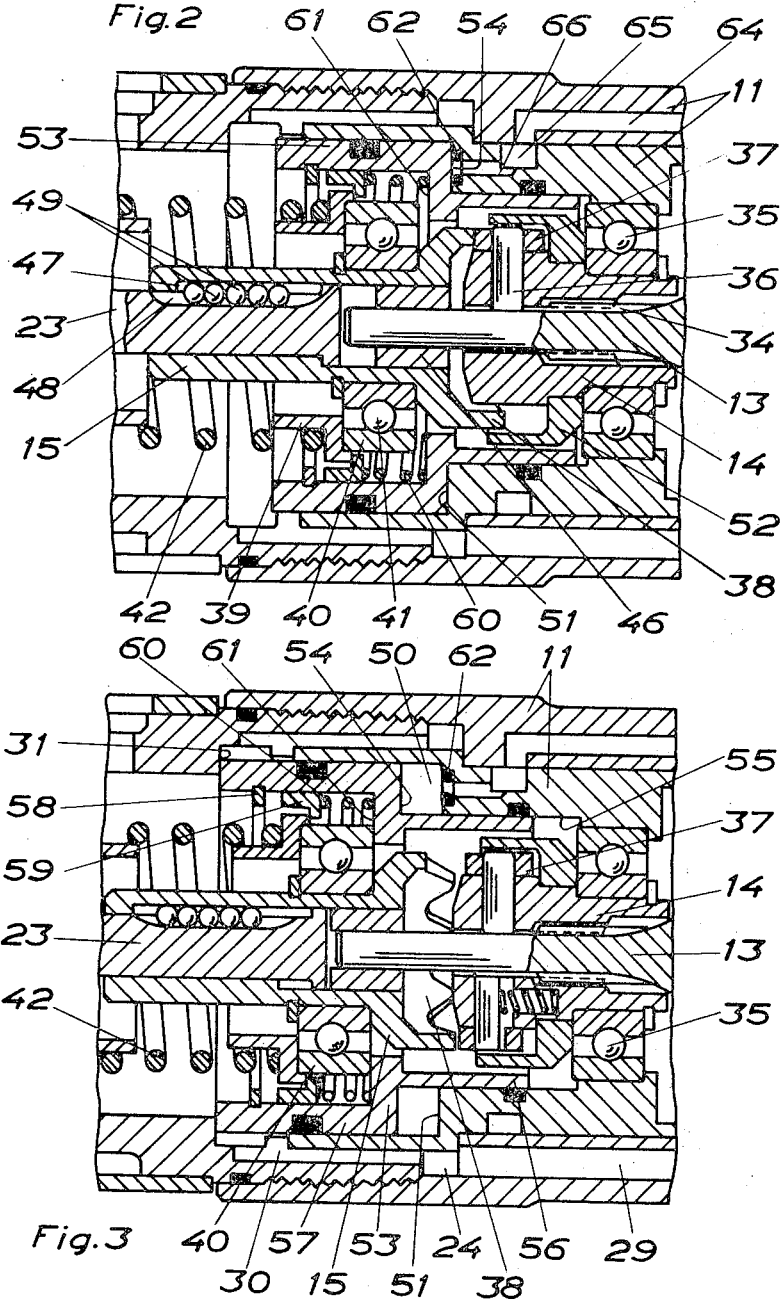

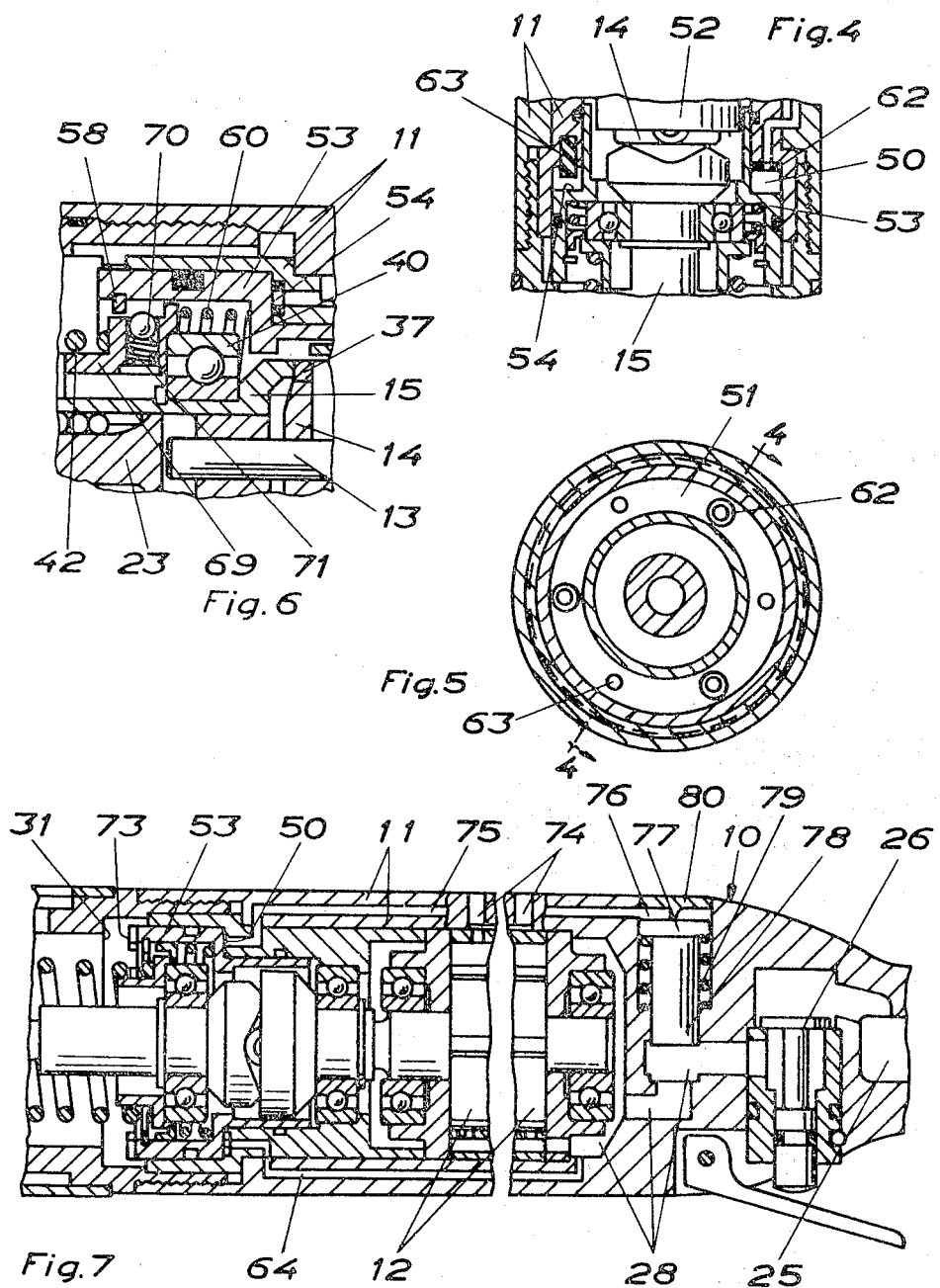

POWER WRENCH WITH A TORQUE LIMITING COUPLING

This invention relates to a power wrench of the continuous torque type with an air motor drivingly connected to the drive spindle over a power transmission that includes a clutch with a clutch member adapted to be positively forced to a completely disengaged position by a piston as soon as the clutch member itself starts a disengaging movement in response to the torque load rising to a pre-determined load.

In prior such tools, the piston is normally a valving element forming with a seat a valve through which the flow of air through the tool is conveyed and it is axially affixed to the axially movable clutch member. The initial movement of the clutch member in response to a rise in the torque load forces the valving element to restrict the air passage and a pressure difference across the valving element results. This pressure difference closes the valve and the valving member disengages the clutch as it moves towards closed position. The play in the valve must be very small and the initial restriction is therefore very much dependent on manufacturing tolerances and wear. Dirt will also affect the restriction. The pressure difference created is relatively small, and the change between the initial movement effected by the clutch itself and the continuing movement effected by the piston will be gradual. The final torque will therefore vary substantially and the operator can be subject to disturbing and dangerous jerks due to a delay in the release of the clutch.

An object of the invention is to provide for a tool of the continuous torque type in which the clutch releases faster, safer and with less distribution in the final torque than in prior tools of this art. Simultanously, in a tool according to the invention, the sliding and sealing surfaces in association with the piston are better protected against dirt in the flowing air, for instance dirt in the form of dust from the vanes. In an embodiment described and shown, the movable clutch member can be movable independently of the piston so that in case of jamming of the piston, the piston can not prevent the release of the clutch which is important for the security of the operator.

The invention will be further described with reference to the accompanying drawings in which FIG. 1a is a longitudinal section through the rear portion of a power wrench of the continuous torque type in accordance with the invention.

FIG. 2 is an enlarged fragmentary view of the middle portion of FIG. 1a with the movable clutch member in engaged position.

FIG. 3 is a view corresponding to FIG. 2 but showing the clutch member released.

FIG. 4 is a fragmentary view of the middle portion of FIG. 1a taken along line 4—4 in FIG. 5, the clutch member being in released position.

FIG. 5 is a section along line 5—5 in FIG. 1a.

FIG. 6 is a partial view corresponding to a portion of FIG. 2 and illustrating a modified embodiment of the details associated with the clutch member.

FIG. 7 is a fragmentary longitudinal section of a modified nut runner.

Figure 1A:
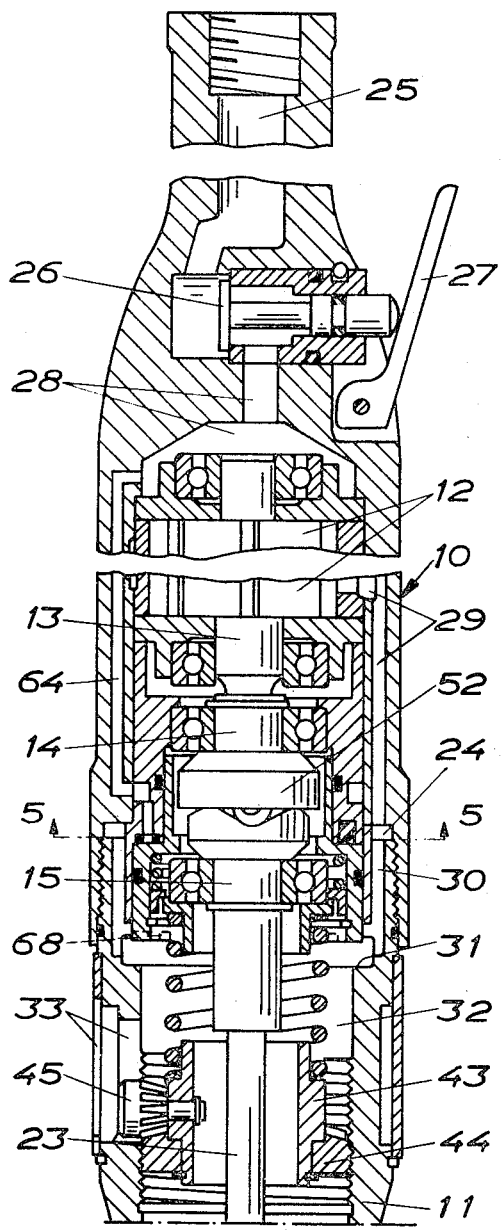
FIG. 1b is a longitudinal section through the front portion of the same power wrench.
Figure 1B:
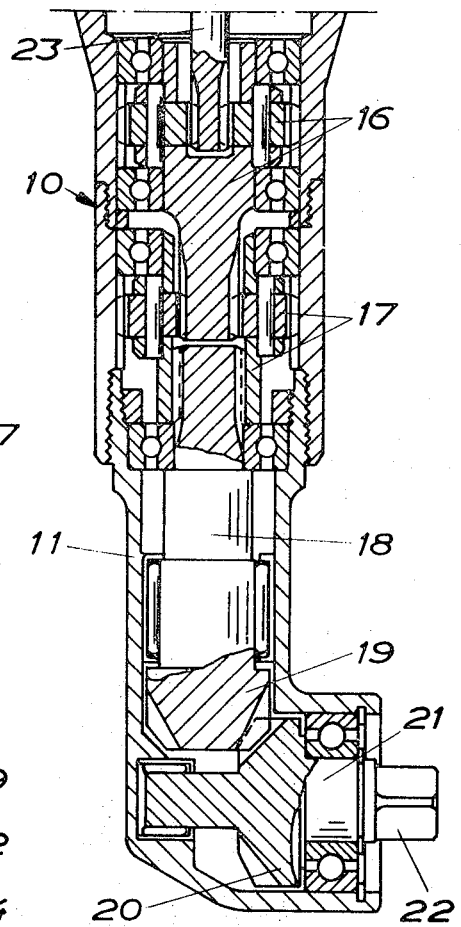

The power wrench in FIGS. 1 – 5 is generally designated 10 and it comprises a housing 11 with a pneumatic sliding vane motor 12 which is drivingly connected to a torque transmission comprising an output shaft 13 of the motor, a driving clutch member 14, a driven clutch member 15, an intermediate shaft 23, two planet gear steps 16,17, a forward shaft 18, an angle gear 19,20, and a tool spindle 21 projecting from the front end of the housing 11. The tool spindle 21 has a drive square 22 on which a non-illustrated tool for instance a nut socket can be mounted.

Compressed air is supplied through a non-illustrated hose and fitting to the rear end of the nut runner 10. The passage for the motive air is formed by a supply passage 25, a control valve 26 which is biased closed and can be opened manually by means of a trigger 27, the inlet 28 of the motor 12, non-illustrated inlet ports of the motor, the exhaust passage or passages 29 of the motor 12, an annular chamber 24, a number of axial passages 30, an annular valve seat 31, an exhaust chamber 32 and one or a number of suitable exhaust passages 33.

The output shaft 13 of the motor 12 is drivingly connected to the driving clutch member 14 by means of a splined connection 34 and it projects freely rotatable with its forward end into a bushing 46 in the driven clutch member 15. The driving clutch member 14 is rotatable but is axially fixed in the housing 11 by means of a ball bearing 35 and it carries radial pins 36. Each of the pins 36 carries rotatably a roller 37 which drivingly meshes with an annular and axial cam curve with cams or teeth 38 with oblique flanks, this cam curve being part of the driven clutch member 15. The pins 36 and the rollers 37 are held in place by means of a sleeve 52 mounted around the clutch member 15. The clutch member 15 is biased to abut against the rollers 37 on the clutch member 14 by means of an adjustable spring 42 acting through an intermediate sleeve 39 and a ball bearing 41. The intermediate sleeve 39 abuts the outer race 40 of the ball bearing and the inner race is axially fixed on the clutch member 15. The spring 14 abuts a bushing 43 supported by an adjusting nut 44 which is formed as a gear meshing with an adjusting gear 45. The adjusting gear 45 is rotatably journalled in the bushing 43 and located in one of the exhaust passages 33 of the housing 11 so that it can be rotated from the outside by means of a suitable key. By this arrangement, the adjusting nut 44 can be axially adjusted in a conventional manner so that the compression and thereby the pre-load of the spring 42 can be varied. The driven clutch member 15 is centered by the intermediate shaft 23 and by the bushing 46 which surrounds the end of the shaft 13. The clutch member 15 is in driving engagement with the intermediate shaft 23 by means of balls 49 placed in grooves 47 and 48 in the clutch member and the intermediate shaft 23, respectively, and the intermediate shaft 23 is a drive shaft for the planet gear step 16.

An annular piston 53 defines with the housing 11 a cylinder chamber 50. The piston has an annular piston face 54, a rearwardly extended annular portion 56 which seals against a bore 55 in the housing, and a forwardly extending annular valve portion 57 which cooperates with an annular seat 31 in the housing 11. In a groove in the valve portion 57 there is a snap ring 58 mounted to serve as a stop for a slidable ring sleeve 59. A spring 60 is braced between the sleeve 59 and a shoulder 61 in the annular piston 53. In the engaged position of the clutch 14,15, FIG. 2, the shoulder 61 is at some distance from the outer race 40 of the ball bearing 41 and the intermediate sleeve 39 abuts both the outer race 40 and the ring sleeve 50 so that the latter is held at a distance from the snap ring 58. By means of the spring 60 the piston face 54 of the annular piston 53 is pressed against three O-rings 62 and three rubber knobs 63, FIGS. 5,6, which are fastened in the end wall 51 of the cylinder chamber 50. The rubber knobs 63 serve as springs. From a suitable place in the air flow passage through the tool 10 downstream of the control valve 26 and preferably before the motor 12, a pressurized passage 64 leads via an annular chamber 65 and axial bores 66 to the interior of the O-rings 62 so that the annular piston 53 is subjected to an axial force by the air pressure working on the small surfaces of the piston face 54 inside the O-rings. This axial force is normally overcome by the spring 60 which presses the piston face 54 to seal against the O-rings 62.

Before using the wrench, the operator adjusts the release torque of the clutch member 15 by turning the adjusting gear 45 in order to adjust the axial position of the adjusting nut 44 which position defines the pre-load of the spring 42. The wrench is connected to a source of pressurized air and a nut socket is mounted on the drive square 22. The operator places the nut socket over the nut or screw which is to be run. When the trigger 27 is actuated, compressed air streams through the supply passage 25, the control valve 26 and the inlet 28 of the motor 12, rotates the motor and leaves through the passages 29, 30, the exhaust chamber 32 and the exhaust passages 33. Simultaneously, the passages 64, the annular chamber 65 and the bores 66 leading to the O-rings 62 adjacent the piston face 54 are pressurized. On account of the spring 60, the annular piston 53 remains in its position shown in FIG. 2. At the run-down operation, the resistance to rotation is small and the motor 12 runs rapidly the nut towards the work piece. As the resistance to rotation increases so that the torque transmitted through the clutch members 14, 15 increases, a relative movement between the clutch members 14, 15 occurs so that the driving rollers 37 roll up along the trailing flanks of the cams 38. This relative movement results in that the driven clutch member 15 and thereby the roller bearing 41 starts to be moved to the left in FIG. 2. The outer race 40 forces the intermediate sleeve 39 to join in this movement and the intermediate sleeve 39 is accompanied by the ring sleeve 59 abutting the intermediate sleeve because of the spring 60.

When, during this axial movement of the clutch member 15, the ring sleeve 59 abuts the stop 58 on the piston 53, the axial force to the right imparted to the piston 53 by the spring 60 is being balanced since the spring is now braced between two abutments on the piston itself. Therefore, the compressed rubber knobs 63 and the pressure inside the O-rings 62 now lift the face 54 of the annular piston 53 from the O-rings 62 so that the compressed air from the bores 66 propagates through the cylinder chamber 50 and forces the piston 53 to continue very rapidly its axial movement to the left into the position shown in FIG. 3. Should the screw-joint be non-resilient so that the reaction torque builds up very rapidly, the ring sleeve 59 will strike the stop 58 and this impact will help to start the movement to the left of the piston 53. During the continuing movement of the piston 53, its shoulder 61 will contact the outer race 40 of the ball bearing 41 and it will thereby axially displace the ball bearing 41 and the clutch member 15. The movement is completed when the valve portion 57 of the piston 53 contacts the valve seat 31 and shuts off the flow of motive air through the wrench so that the motor stops. The various details are now in the position shown in FIG. 3. Since the valve 57,31 shuts off the spent motive air a counter pressure builds up to stop the motor. The clutch member 15 is now positively held in released position by the piston 53.

The wrench has now run the nut to the final torque that depends on the force of the spring 42, and the rotation of the drive square 22 has ceased since the clutch member 15 is completely disengaged from the clutch member 14. The motor has stopped. When the operator now releases the trigger 27, the control valve 26 is moved to closed position by the pressure in the conduit 25 or by a non-illustrated return spring, and the pressure down-stream of the control valve 26 is relieved through leakage in the motor 12. Simultaneously, the cylinder chamber 50 is relieved of pressure through the passage 64, and as the air pressure working on the piston face 54 decreases, the spring 42 moves the intermediate sleeve 39 to the right in FIG. 3 until the clutch member 15 again abuts the rollers 37 of the clutch member 14 as shown in FIGS. 1a and 2, i.e., until the clutch member 15 is drivingly connected to the clutch member 14. The spring 60 presses the piston face 54 of the piston 53 against the rubber knobs 63 and O-rings 62, and the wrench is ready for another running-down operation.

Should the annular piston 53 by any reason jam at the beginning of its disengaging movement, the driven clutch member 15 will continue its disengaging axial movement independently of the piston 53 until the rollers 37 of the clutch member 14 has passed the tips of the cams 38 of the driven clutch member 15 and the clutch members 14,15 will start working as a ratcheting clutch. The operator will therefore be protected against the dangerous reaction torque which could be created if the annular piston 53 were axially fixed to the driven clutch member 15.

It is not necessary that the motor is adapted to be stopped when the clutch 14,15 is released, and recesses 68 in the end face of the valve portion 57 of the piston 53, schematically indicated by a dotted line in FIG. 1a, can be provided to permit a part of or the entire flow to pass the seat 31 so that the rotation of the motor continues until the trigger 27 is released.

In the modified design shown in FIG. 6, the outer race 40 of the ball bearing is loaded by the spring 42 over an intermediate sleeve 69 which carries a ball 70 loaded by a radial spring 71. During the first axial movement of the clutch member 15 caused by the torque between the cams 38 and the rollers 37, the ball 70 abuts the snap ring 58 and forces the piston 53 to the left in the figure so that the cylinder chamber 50 is pressurized in the way previously described. The rubber knobs 63 shown in FIG. 5 can be omitted. Should the annular piston 53 jam in the cylinder chamber 52, the ball 70 will pass the snap ring 58 and the clutch 14,15 start ratcheting in the same way as previously described.

In the power wrench shown in FIG. 7, the details associated with the clutch members 14,15 are the same as in FIGS. 1 – 5. However, the annular piston 53 does not serve as a valve and the motor 12 is provided with exhaust ports 74 leading directly to the atmopshere or to a non-illustrated muffler. Thus, the air flow through the wrench is not conveyed through the annular seat 31 and the annular piston 53 is provided with axial knobs 73 which are forced against the annular seat 31 when the cylinder chamber 50 is pressurized. From the cylinder chamber 50, a passage 75 leads to a cylinder chamber 76 in the housing 11. A piston 77 is slidable in the cylinder chamber 76 and projects with a piston rod 78 into the inlet passage 28. A coil spring 79 biases the piston 77 outwardly against a cover 80 of the cylinder 76. When the cylinder 76 is pressurized through the passage 75 the piston 77 compresses the spring 79 and the piston rod 78 of the piston is forced into the inlet 28 to cut off the supply flow to the motor 12. The motor 12 will therefore stop as soon as the annular piston 53 moves from its seat and the cylinder chamber 50 and thereby the passage 75 are pressurized. The movement of the piston 53 is initiated by the clutch member 15 as described with reference to FIGS. 1 – 5.

I claim:

1. A power wrench of the continuous torque type comprising an air motor drivingly connected to a drive spindle through a power transmission that includes a clutch with a clutch member axially movable between a completely engaged and a completely disengaged position, said clutch being adapted to create a disengaging force on said clutch member in response to the torque transmitted, a ball bearing having its inner race axially affixed on said clutch member and its outer race axially loaded by a spring so as to load the clutch member towards the engaged position, a piston provided with means to axially engage with said outer race and slideable in a cylinder to define a cylinder chamber therewith for positively moving said clutch member into its disengaged position when said cylinder chamber is being pressurized, and a pressurized passage ending in said cylinder, said piston being adapted to isolate said pressurized passage from said cylinder chamber when said clutch member is in its engaged position but being adapted to open said pressurized passage to said cylinder chamber when said clutch member moves out of its engaged position in response to the torque load rising to a predetermined load.

2. A power wrench as defined in claim 1 in which said clutch member is freely axially movable into its disengaged position as a result of the disengaging force created by the clutch itself independently of the position of the piston.

3. A power wrench as defined in claim 1 in which a spring is braced between said piston and a supporting member adapted to move conjointly with the outer race of said ball bearing in order to force the piston into an axial end position when said clutch member is in its engaged position, said supporting member being adapted to engage with a member on said piston when said clutch member is moving out of its engaged position in response to the torque load rising to the predetermined load, whereby the piston is initiated to move out of said end position and open said pressurized passage to the cylinder chamber.

4. A power wrench as defined in claim 3 in which at least one pressurized valve seat is connected to said pressurized passage, said at least one valve seat being arranged in the end wall of said cylinder chamber, and said piston is adapted to abut and close said at least one valve seat when in said end position.

5. A power wrench as defined in claim 4. in which resilient members are arranged between said piston and the end wall of said cylinder so as to unseat said piston when said abutment member reaches said stop member.

6. A power wrench as defined in claim 1 in which a spring is braced between said piston and a supporting member axially supported by but slideable to a member axially fixed to said outer race of said ball bearing in order to force the piston into an axial end position when said clutch member is in its engaged position, said supporting member being adapted to engage with a stop member on said piston so as to become axially supported by said piston when said clutch member is moving out of its engaged position in response to the torque load rising to the predetermined load, whereby the piston is initiated to move out of said end position and open said pressurized passage to the cylinder chamber.

7. A power wrench as defined in claim 6. in which at least one pressurized valve seat is connected to said pressurized passage, said at least one valve seat being arranged in the end wall of said cylinder chamber, and said piston is adapted to abut and close said at least one valve seat when in said end position.

8. A power wrench as defined in claim 1 in which at least one pressurized valve seat is connected to said pressurized passage, said at least one valve seat being arranged in the end wall of said cylinder chamber, and said piston is adapted to abut and close said at least one valve seat when said clutch member is in its engaged position.

9. A power wrench of the continuous torque type comprising an air motor drivingly connected to a drive spindle through a power transmission that includes: a clutch with a clutch member axially movable between a completely engaged and a completely disengaged position and biased towards its engaged position, said clutch being adapted to create a disengaging force on said clutch member in response to the torque transmitted, a piston provided with means to axially engage with means on said clutch member and slideable in a cylinder to define a cylinder chamber therewith for positively moving said clutch member into its disengaged position when said cylinder chamber is being pressurized, and a pressurized passage ending in said cylinder, said piston being adapted to isolate said pressurized passage from said cylinder chamber when said clutch member is in its engaged position but being adapted to open said pressurized passage to said cylinder chamber when said clutch member moves out of its engaged position in response to the torque load rising to a predetermined load, said clutch member being axially freely movable into its disengaged position as a result of the disengaging force created by the clutch itself independently of the position of the piston.

10. A power wrench of the continuous torque type comprising an air motor drivingly connected to a drive spindle through a power transmission that includes: a clutch with a clutch member axially movable between a completely engaged and a completely disengaged position and biased towards its engaged position, said clutch being adapted to create a disengaging force on said clutch member in response to the torque transmitted, an annular piston provided with means to axially engage with means on said clutch member and slideable in a cylinder to define a cylinder chamber therewith for positively moving said clutch member into its disengaged position when said cylinder chamber is being pressurized, said cylinder having an end wall, a number of pressurized valve seats arranged in the end wall of said cylinder chamber, spring means connected between said clutch member and said piston to force said piston to abut against and close said valve seats when said clutch member is in its engaged position and means to initiate said piston to unseat in response to said clutch member moving out of its engaged position so as to effect a pressurization of said cylinder chamber.

11. A power wrench as defined in claim 10. in which the motive air of the motor is conveyed through a passage which includes a shut-off valve, said shut-off valve comprising a valving member associated with said piston and cooperating with a valve seat.

12. A power wrench as defined in claim 11. in which said valving member is annular and integral with the piston.

13. A power wrench as defined in claim 12. in which the shut-off valve is arranged to control the spent motive air downstream of the motor.

14. A power wrench as defined in claim 13. in which the piston is annular and interposed radially between said clutch member and a number of passages leading from the motor outlet to said shut-off valve.

15. A power wrench as defined in claim 10. in which the inner race of a ball bearing is axially fixed on said clutch member and the outer race of the ball bearing is axially loaded by a spring to bias the clutch member towards its engaged position, said piston being adapted to axially engage with said outer race for forcing said clutch member into its disengaged position.

* * * * *